US007742614B2

(12) United States Patent
Christensen et al.

(10) Patent No.: US 7,742,614 B2
(45) Date of Patent: Jun. 22, 2010

(54) HEARING AID WITH ANTENNA FOR RECEPTION AND TRANSMISSION OF ELECTROMAGNETIC SIGNALS

(75) Inventors: Kare T. Christensen, Smørum (DK); Ove Knudsen, Smørum (DK)

(73) Assignee: Oticon A/S, Smørum (DK)

(*) Notice: Subject to any disclaimer, the term of this patent is extended or adjusted under 35 U.S.C. 154(b) by 0 days.

(21) Appl. No.: 10/589,759

(22) PCT Filed: Feb. 16, 2005

(86) PCT No.: PCT/DK2005/000100

§ 371 (c)(1),
(2), (4) Date: Jul. 13, 2007

(87) PCT Pub. No.: WO2005/081583

PCT Pub. Date: Sep. 1, 2005

(65) Prior Publication Data

US 2008/0056520 A1 Mar. 6, 2008

(30) Foreign Application Priority Data

Feb. 19, 2004 (DK) .............................. 2004 00259

(51) Int. Cl.
*H04R 25/00* (2006.01)
*H01Q 1/12* (2006.01)
*H02J 7/00* (2006.01)

(52) U.S. Cl. ...................... 381/324; 381/315; 381/322; 343/718; 320/108; 455/575.5

(58) Field of Classification Search ................ 381/314, 381/315, 322, 324, 331; 343/718, 842; 320/108; 455/41.2, 575.5
See application file for complete search history.

(56) References Cited

U.S. PATENT DOCUMENTS

| | | | | |
|---|---|---|---|---|
| 5,020,136 | A | 5/1991 | Patsiokas et al. | |
| 5,349,362 | A | 9/1994 | Forbes et al. | |
| 5,390,254 | A * | 2/1995 | Adelman | 381/322 |
| 5,721,783 | A | 2/1998 | Anderson | |
| 5,734,976 | A * | 3/1998 | Bartschi et al. | 381/328 |
| 6,137,889 | A | 10/2000 | Shennib et al. | |
| 2002/0030630 | A1 * | 3/2002 | Maeda et al. | 343/702 |
| 2002/0191806 | A1 * | 12/2002 | Rohrseitz et al. | 381/323 |

(Continued)

FOREIGN PATENT DOCUMENTS

EP 1 326 302 A2 7/2003

(Continued)

*Primary Examiner*—Curtis Kuntz
*Assistant Examiner*—Jesse A Elbin
(74) *Attorney, Agent, or Firm*—Birch, Stewart, Kolasch & Birch, LLP

(57) ABSTRACT

The invention regards a communication device which is adapted for placement in a users ear. The communication device comprises a shell part enclosing an input transducer for receiving an input signal, a signal processing device and an output transducer for providing a signal perceivable as sound, a battery located at a surface part of the shell which is facing away from the head of the user, a transmission and reception circuit for transmission and/or reception of electromagnetic energy. According to the invention an antenna for radiating and/or receiving electromagnetic energy is provided such that it has a first surface turned towards the surroundings and a second surface located in close proximity of the battery.

16 Claims, 6 Drawing Sheets

U.S. PATENT DOCUMENTS

| | | | | |
|---|---|---|---|---|
| 2003/0025478 | A1* | 2/2003 | Zink et al. | 320/108 |
| 2003/0086583 | A1 | 5/2003 | Maltan et al. | |
| 2003/0152243 | A1* | 8/2003 | Julstrom et al. | 381/315 |
| 2008/0095387 | A1* | 4/2008 | Niederdrank et al. | 381/314 |

FOREIGN PATENT DOCUMENTS

| | | | |
|---|---|---|---|
| EP | 1 389 035 | A2 | 2/2004 |
| WO | WO-99/48330 | A1 | 9/1999 |

* cited by examiner

HEARING AID WITH ANTENNA FOR RECEPTION AND TRANSMISSION OF ELECTROMAGNETIC SIGNALS

AREA OF THE INVENTION

The invention regards hearing aids or other listening devices wherein-wireless reception and transmission means are provided. Especially in ITE (in the ear) and CIC (completely in the canal) style hearing aids it is a problem to accommodate antennas for the provision of the wireless transmission.

BACKGROUND OF THE INVENTION

In small hearing aids which are to be worn in the ear, the distance between the antenna and the receiver or speaker will be small and as a result, the antenna is likely to pick up unwanted electromagnetic radiation. Inside the hearing aid a microphone and a receiver are placed along with a signal processing device and a battery. The receiver delivers a signal to the user which is perceivable as sound but at the same time the receiver will radiate electromagnetic energy and this is likely to be collected by the antenna and may give rise to either feedback problems or noise. Hearing aids of the above kind are often custom made and the location of electronic devices (the receiver and the signal processing device) within the casing may differ in different hearing aids. As the function of the antenna may depend on the location of nearby electric components it is a problem to not know the exact location of nearby components in advance as this may lead to antennas with widely varying performance in different hearing aids.

Today wireless communication at frequencies above approximately 1 MHz is not implemented in In-The-Ear (ITE) hearing aids. This will most likely change in the future, and then highly efficient antennas (compared to the available volume) will be needed in order to enable acceptable performance (range, current consumption, etc.). One patent application has been published in this area covering amongst others the use of the pull-out string as an antenna. U.S. Pat. No. 5,721,783 discloses a hearing aid or audio communication system includes an earpiece that can be hidden in the ear canal, and which communicates wirelessly with a remote processor unit, that enhances audio signals and can be concealed under clothing. The disclosed hearing aid has an antenna arranged in conjunction with the pull out string of the hearing aid.

In prior art document EP 1326302 an integrated circuit fractal antenna in a hearing aid device is disclosed. The fractal antenna can be incorporated in the hearing device to optimize wireless communication capabilities of the device.

EP 1013143 discloses a hearing aid comprising a detector for wireless reception of signals and a system comprising said hearing aid. The disclosed hearing aid accommodates an electronic circuit and a battery compartment. A faceplate includes a lid-shaped element which can be moved with respect to the battery compartment. A detector is secured to the lid-shaped element, which detector is embodied so as to be suitable for the wireless reception of signals and conversion thereof to electrical signals. The hearing aid is provided with an electrical connection means which, at least in the closed position of the lid-shaped element, connects the detector to the electronic circuit. The disclosed detector is used for the reception of signals in the infrared light range. As this known receptor works in the infrared light range, where the penetration depth of the signals is poor, it must be placed at an external surface part.

The antenna according to the present invention will be working in the radio frequency range, where the penetration depth of signals is grater, and it cannot in advance easily be determined what will be an advantageous position of the antenna. Further the sensitivity of a radio frequency antenna towards close by electronic components is a problem which has not been dealt with previously.

SUMMARY OF THE INVENTION

It is the object of the invention to provide an antenna for wireless transmission/reception of electromagnetic signals in an ITE or CIC style hearing aid or other listening device, wherein the antenna is not influenced by the varying position of the receiver or other electronic components of the listening device. Further an improved and uniform radiation and reception characteristic for custom made hearing aids is desired.

This is achieved by the communication device as claimed in claim 1. Accordingly the device is adapted for placement in a users ear and comprises a shell part enclosing an input transducer for receiving an input signal, a signal processing device and an output transducer for providing a signal perceivable as sound, a battery located at a surface part of the shell which is facing away from the head of the user, a transmission and reception circuit for transmission and reception of electromagnetic energy, and whereby an antenna for radiating and/or receiving electromagnetic energy is provided such that it has a first surface turned towards the surroundings and a second surface located in close proximity of the battery.

By placing the antenna outwardly of the battery the battery may be used as ground, and this is an advantage. Also the position of the battery between the antenna and the other components within the hearing aid will help to ensure, that the antenna does not become de-tuned when the receiver or other components within the shell are fixed at a given position during finishing of custom made hearing aids. Further the battery will provide electromagnetic shielding between the antenna and other parts of the hearing aid circuitry.

According to the invention the antenna is tuned to radiate and/or receive electromagnetic energy in the frequency range of 50 MHz to 50 GHz. Within this range radio communication is allowed in various bands in most countries without any licence. Examples of such bands are the ISM bands. This also means that there is likely to be some noise in these frequency bands, and this is a further reason for the antenna to be effective. The antenna is usable for either digital or analog coding of signals.

Preferably the antenna is shaped as a part of a flexprint. This construction is advantageous because it is possible to use the flexibility of the flexprint to pride connections across possible moving parts, like from the battery lid to the rest of the hearing aid.

In an embodiment of the invention the antenna is embedded in material externally of the battery. Embedding the antenna in material will aid to protect the antenna and at the same time minimize the space taken up by the antenna. The embedding may be accomplished by over-molding a flexprint-antenna or a solid metal part. It could also be realized by providing a surface metalization trace on a polymer part of the antenna and then overmolding or covering the surface trace in some other way.

In a further embodiment the antenna covers a surface area of the shell which is wider than the projection of the battery onto the faceplate surface. In most ITE hearing aids the battery lid has the same dimensions as the battery. This is a serious limitation for the antenna, and this can be overcome by allowing the antenna to extend sideways beyond the size of the battery and the battery lid. The antenna cannot however be allowed to extend beyond the overall size of the hearing aid.

In an embodiment the antenna comprises a loop, which is usable also as a charging loop for a battery. In modern hearing aids rechargeable batteries are becoming more common, and in order to charge the batteries the hearing aid is placed in a strong varying magnetic field, which will generate a current in an electric loop or coil inside the hearing aid. It has been discovered that the antenna can be used as the induction loop on the secondary side of such a charging device.

DESCRIPTION OF A PREFERRED EMBODIMENT

Initially it is worth noting that we are dealing with small antennas, meaning that the wavelength is much larger than the physical size of the antenna and therefore the antenna has a narrow bandwidth (high quality factors) and low efficiency (small radiation resistance compared to the loss resistance). If high currents are dominating, the structure will mainly radiate the magnetic field and vice versa: if high voltages are present, a dominating electric field must be expected.

Figure 1:
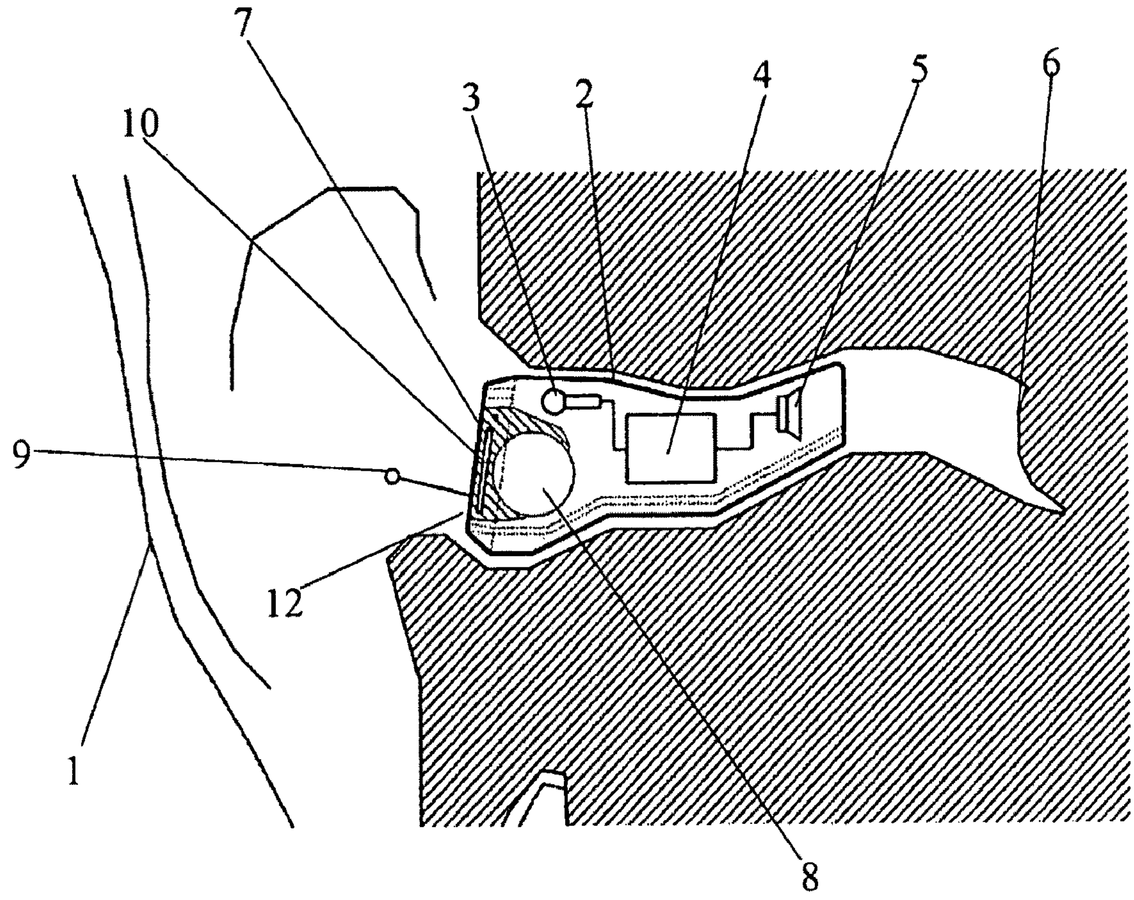
FIG. 1 is a side view of a schematic representation of an ITE hearing aid with an antenna according to the invention.

In FIG. 1 a schematic sectional representation of a CIC hearing aid is shown with an antenna according to the invention. The hearing aid comprises a custom made shell part 2 which is placed deep in the ear canal. Instead of being custom made the shell part can be either flexible or have a flexible outer portion which allows it to be inserted into the ear. 1 is an outline of the external ear of a person. The shell part 2 encloses a receiver 5, a signal processing unit 4 and a microphone 3. The receiver 5 is arranged with an output orifice (not shown) close to the tympanic membrane 6 in order to deliver a useful audio signal to the user. A front plate part 12 is arranged to face the surroundings. In this part a battery drawer 7 with a battery 8 is placed. Also an extractor 9 may be comprised in the front plate. Other components may be placed in the shell or associated with the front plate part 12, such as further microphones or connectors for wired contact with other equipment like telephones. Also the hearing aid will comprise a transmission and/or reception circuit in order to feed/receive electromagnetic energy to/from the antenna. This circuit is connected to the antenna and to the signal processing part 4. The transmission and/or reception circuit is not shown in the figures, and it may be configured as an independent circuit part or it can be configured as part of the signal processing part 4.

An antenna 10 is schematically shown. The antenna 10 is placed in the area between the battery and the external surface of the frontal plate. The antenna 10 is preferably associated the battery drawer 7.

Figure 2:
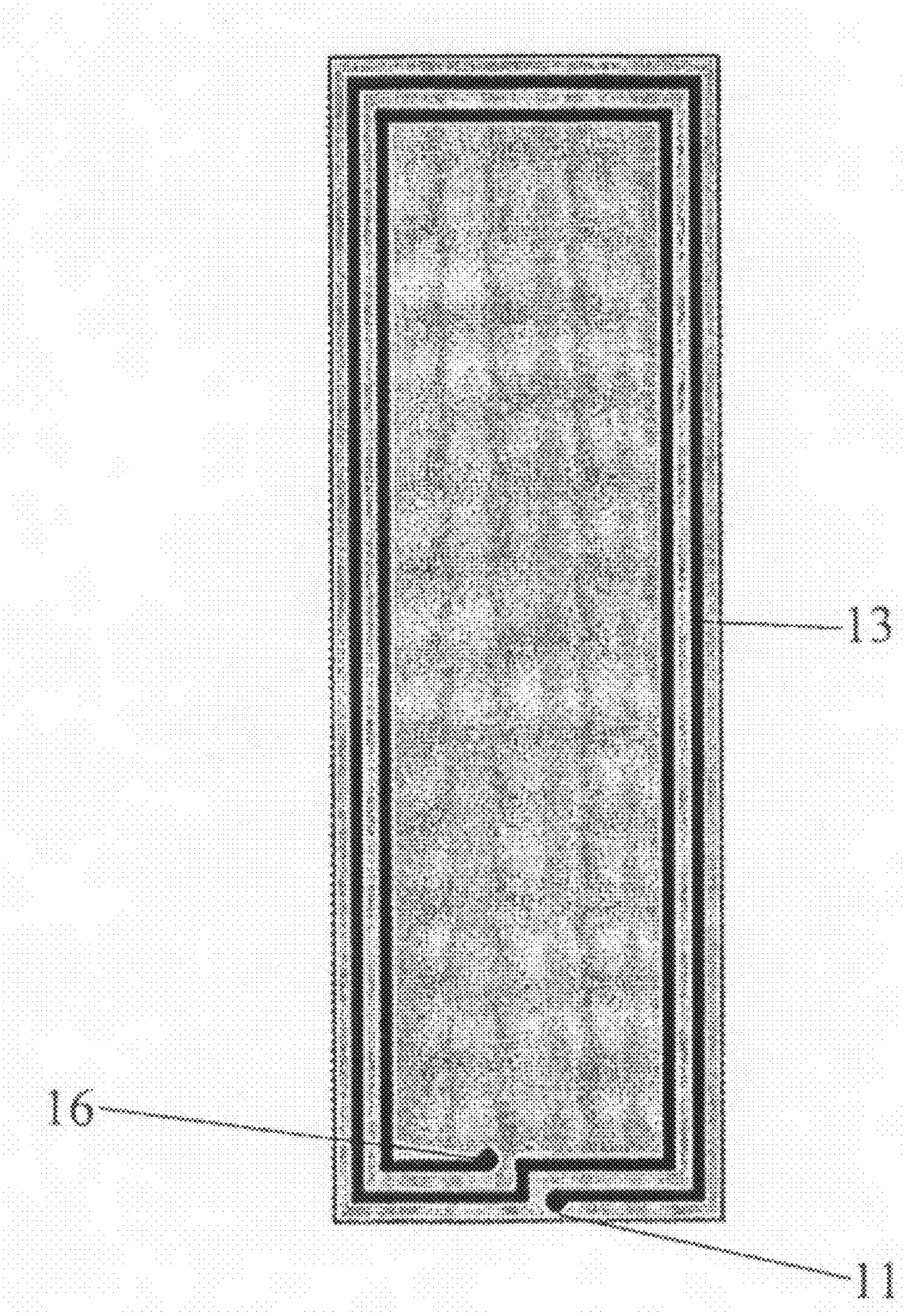
FIG. 2 is a schematic representation of an antenna according to the invention.

FIG. 2 displays a loop antenna 13. The inductive part of the antenna impedance has to be resonated with an external capacitor (not shown). The magnetic field generated by the loop current is the radiating component and dominating in the near field, especially if it is exited by a balanced signal. If operated in unbalanced mode it will also radiate the electric field. The antenna is less sensitive to detuning from near by objects. The loop has two connections 16 and 11 and can be placed circumferentially with regards to the battery 8.

Figure 3:
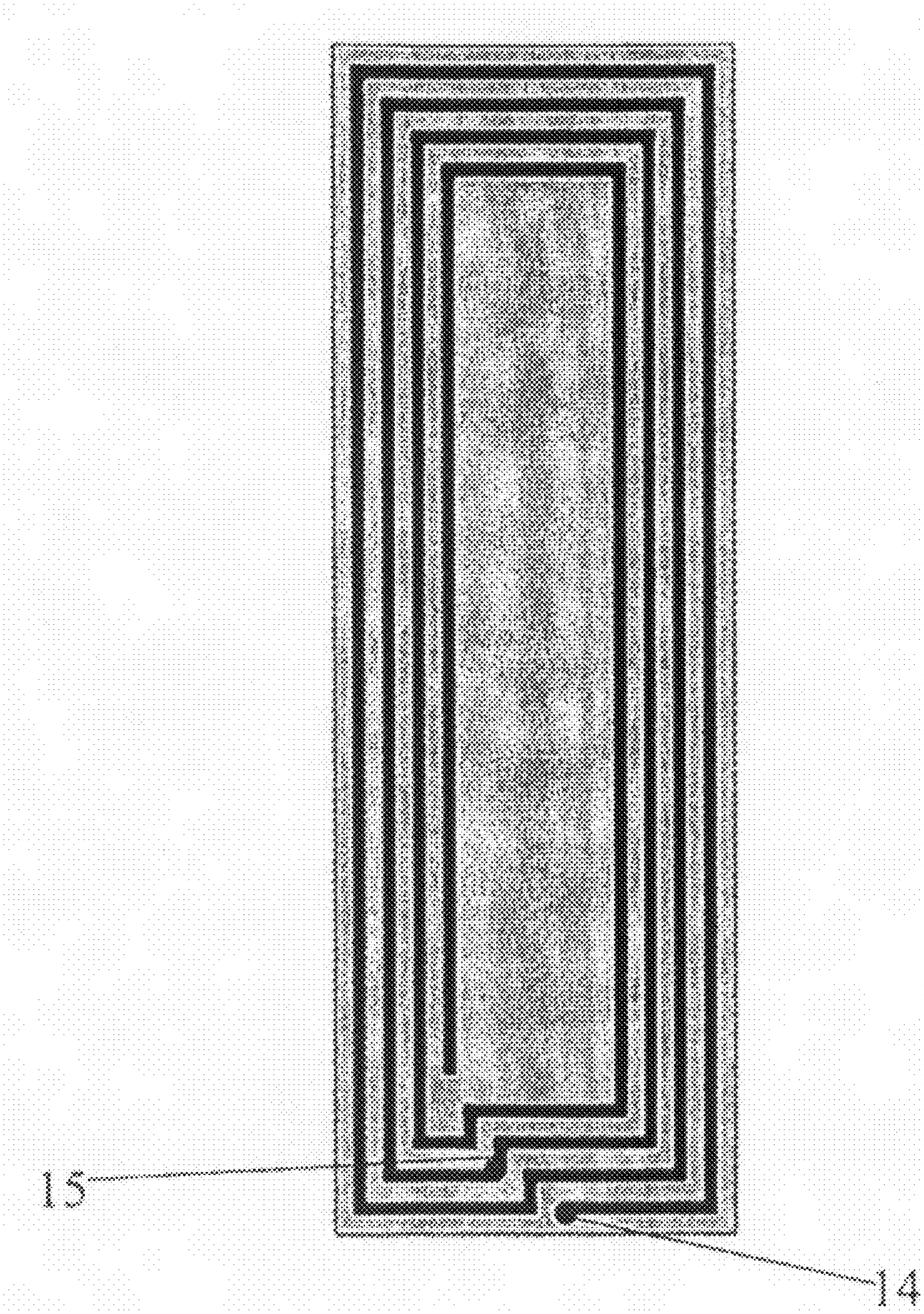
FIG. 3 is a schematic representation of an antenna according to the invention.

In FIG. 3 a schematic representation of a loop+helix antenna is shown. This antenna structure is unbalanced and can be made resonant by itself or in combination with an external capacitor. The antenna impedance is adjustable by tapping. Both the H and E fields are radiated from the structure and due to the high end impedance of the helix and compared to the loop antenna, increased sensitivity towards detuning by near by objects must be expected. Two connection points 14 and 15 are shown. A loop of two turns and a helix part of two turns is showed but a higher or lower number of turns may be used.

Figure 4:
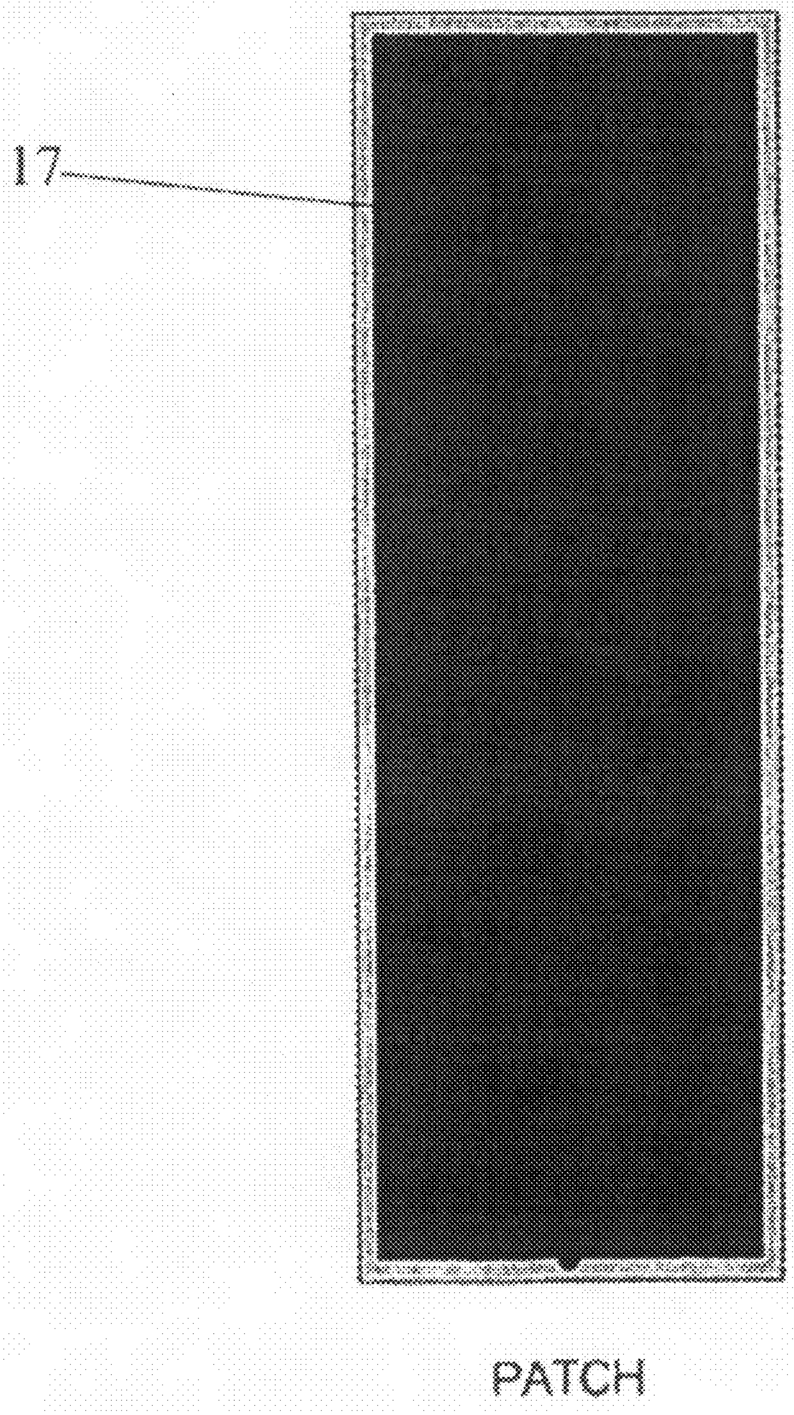
FIG. 4 is a schematic representation of an antenna according to the invention.

FIG. 4 discloses a patch antenna 17. Because of the small size of the patch 17 compared to the wavelength the patch 17 can be considered as a capacitor that will require an inductor to be made resonant. The duality between the small loop and the patch is evident. The patch will radiate the electric field from the edges but the tuning inductor will inevitably also add to the radiation pattern with a magnetic contribution. If the patch has a nearby ground plane, only moderate sensitivity to detuning from close by objects will occur.

Figure 5:
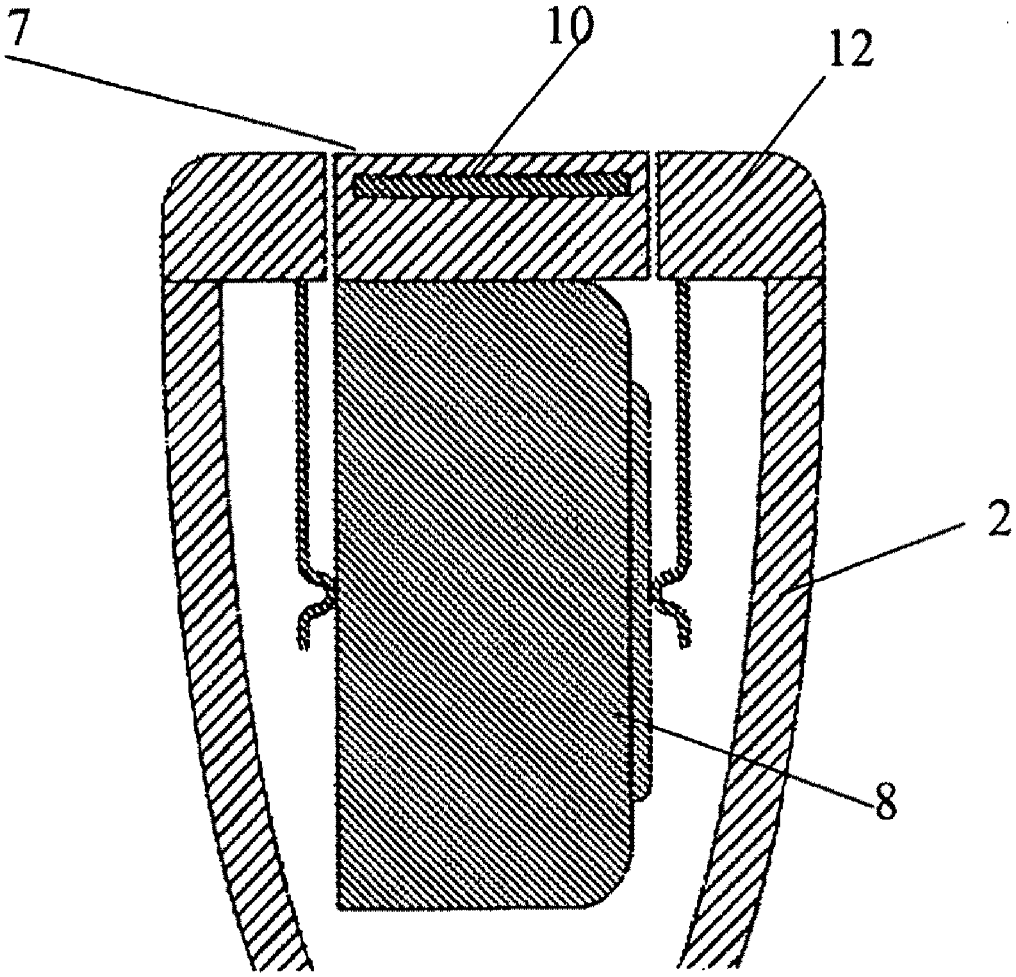
FIG. 5 is a schematic representation of an antenna in side sectional view.

In FIG. 5 an enlarged side sectional view of an embodiment of the invention is schematically shown. The antenna 10 could be either a loop or a patch antenna and in the shown embodiment it is embedded within the material of the battery lid 2. In this way the antenna 10 will lie close to the battery 8, which thereby may function as ground plane and at the same time shield the antenna 10 from receiving radiation from the possible electromagnetic noise from the speaker or other electronic objects in the hearing aid.

Figure 6:
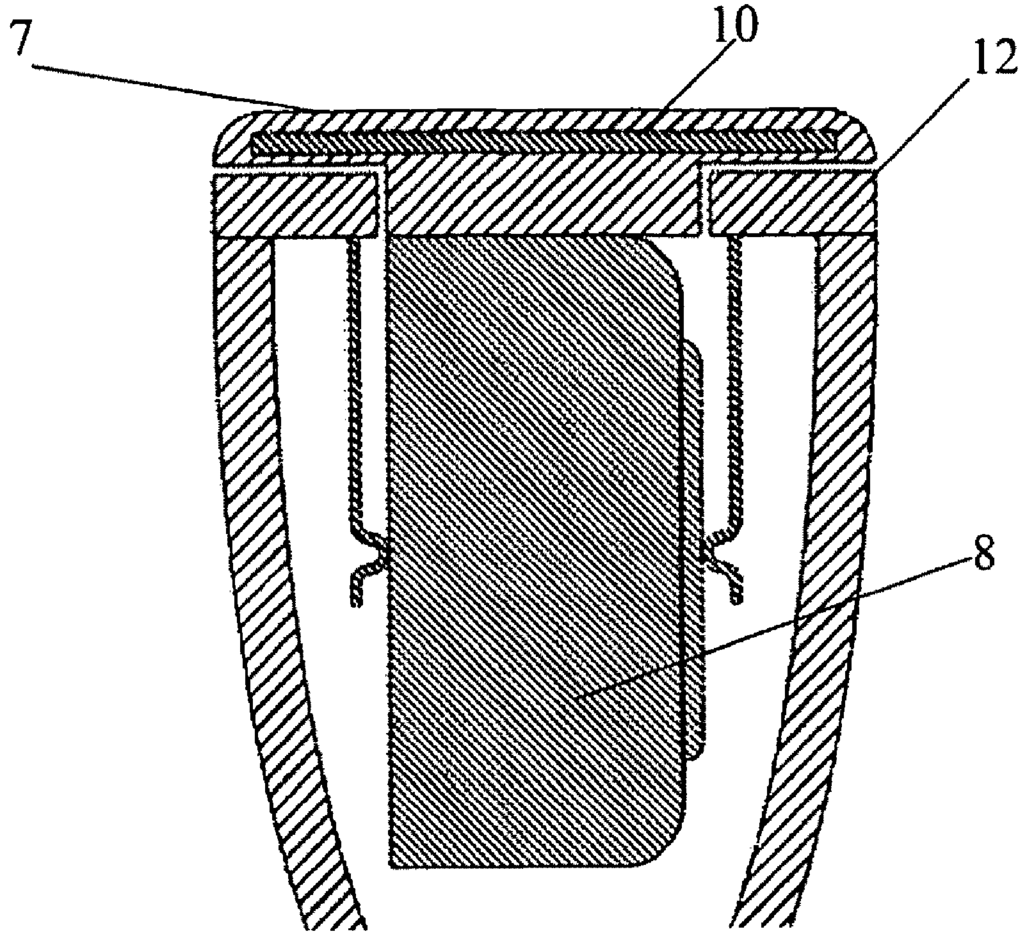
FIG. 6 is a schematic representation of an antenna in side sectional view.

In FIG. 6, an other embodiment of the invention is schematically shown in sectional view. Here the antenna 10 has an extension, which is wider than the projection of the battery 8 on the battery lid 7. The shielding effect of the battery 10 and also the usefulness of the battery as ground plane are not impaired by this, and at the same time an antenna covering a larger area is achieved, whereby further the antenna becomes more effective.

The invention claimed is:

1. Communication device adapted for placement in a users ear, the device comprising:

a custom-made shell part enclosing an input transducer for receiving an input signal, a signal processing device and an output transducer for providing a signal perceivable as sound, a battery located at a surface part of the shell which is facing away from the head of the user, and a transmission and reception circuit for transmission and/or reception of electromagnetic energy, the transmission and reception circuit including a planar antenna for radiating and/or receiving electromagnetic energy, the antenna being disposed in relation to the battery such that the antenna has a first surface facing away from the battery and a second surface facing towards the battery, the antenna and battery further being situated in close proximity to each other such that the battery is an electromagnetic shield between the antenna and other parts of the communication device circuitry, thereby preventing the antenna from becoming de-tuned as a result of variations in the position of the other circuitry in the device, and also such that the battery is a ground plane for the antenna.

2. Communication device as claimed in claim 1, wherein the antenna is tuned to radiate and/or receive electromagnetic energy in the frequency range of 50 MHz to 50 GHz.

3. Communication device as claimed in claim 1, wherein the antenna is shaped as a part of a flexprint.

4. Communication device as claimed in claim 1, wherein the antenna is embedded in a face plate and/or battery drawer.

5. Communication device as claimed in claim 4, wherein the antenna is a metal part.

6. Communication device as claimed in claim 1, wherein the antenna is manufactured by deposition of metal material on surface parts of a faceplate and/or battery drawer.

7. Communication device as claimed in claim 1, wherein the antenna covers a surface area of the shell which is wider than the projection of the battery onto a faceplate surface.

8. Communication device as claimed in claim 1, wherein the antenna is also a charging loop for the battery.

9. A method of shielding a planar antenna in a hearing aid from de-tuning or electromagnetic noise effects caused by other components in the hearing aid, the method comprising:

preventing the planar antenna from becoming de-tuned as a result of the position of other hearing aid circuitry located inside said hearing aid by disposing the planar antenna, which is part of a transmission and reception circuit, in close proximity to a battery situated inside the hearing aid such that the planar antenna has one surface facing in a sound-gathering direction of the heading aid and an opposite surface facing towards the battery, said preventing including electromagnetically shielding the planar antenna with respect to the other hearing aid components and arranging the battery as a ground plane for the antenna.

10. The method of claim 9, wherein the antenna is tuned to radiate and/or receive electromagnetic energy in the frequency range of 50 MHz to 50 GHz.

11. The method of claim 9, further comprising shaping the antenna as a part of a flexprint.

12. The method of claim 9, further comprising embedding the antenna in a face plate and/or battery drawer.

13. The method of claim 12, wherein the antenna is a metal part.

14. The method of claim 9, further comprising manufacturing the antenna by depositing metal material on surface parts of a faceplate and/or battery drawer.

15. The method of claim 9, further comprising positioning the antenna such that it covers a surface area of a shell of the hearing aid which is wider than the projection of the battery onto a faceplate surface.

16. The method of claim 9, further comprising configuring the antenna as a charging loop for the battery.

* * * * *